United States Patent
Chae et al.

(10) Patent No.: US 11,973,219 B2
(45) Date of Patent: Apr. 30, 2024

(54) METHOD FOR PRE-LITHIATION OF NEGATIVE ELECTRODE FOR LITHIUM SECONDARY BATTERY AND LITHIUM METAL LAMINATE USED THEREFOR

(71) Applicant: LG CHEM, LTD., Seoul (KR)

(72) Inventors: Oh-Byong Chae, Daejeon (KR);
Jun-Hyuk Song, Daejeon (KR);
Yoon-Ah Kang, Daejeon (KR);
Je-Young Kim, Daejeon (KR);
Sang-Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 177 days.

(21) Appl. No.: 16/611,645

(22) PCT Filed: Dec. 20, 2018

(86) PCT No.: PCT/KR2018/016386
§ 371 (c)(1),
(2) Date: Nov. 7, 2019

(87) PCT Pub. No.: WO2019/135525
PCT Pub. Date: Jul. 11, 2019

(65) Prior Publication Data
US 2020/0067085 A1 Feb. 27, 2020

(30) Foreign Application Priority Data

Jan. 3, 2018 (KR) .................. 10-2018-0000809
Dec. 19, 2018 (KR) .................. 10-2018-0165584

(51) Int. Cl.
*H01M 4/38* (2006.01)
*H01M 4/02* (2006.01)
(Continued)

(52) U.S. Cl.
CPC ......... *H01M 4/382* (2013.01); *H01M 4/0404* (2013.01); *H01M 4/133* (2013.01);
(Continued)

(58) Field of Classification Search
CPC .... H01M 4/382; H01M 4/366; H01M 4/0404; H01M 4/133; H01M 4/622;
(Continued)

(56) References Cited

U.S. PATENT DOCUMENTS

2008/0070120 A1    3/2008  Miyawaki et al.
2010/0175822 A1*   7/2010  Eguchi ............... H01G 11/22
                                                    156/246
(Continued)

FOREIGN PATENT DOCUMENTS

CN    103378347 A  * 10/2013
CN    107799721    *  3/2018
(Continued)

OTHER PUBLICATIONS

JP-2007242590-A Yamada, Espacenet machine translation (Year: 2007).*
(Continued)

*Primary Examiner* — Brittany L Raymond
(74) *Attorney, Agent, or Firm* — Birch, Stewart, Kolasch & Birch, LLP

(57) ABSTRACT

A method for pre-lithiation of a negative electrode is disclosed, including the steps of: producing a lithium metal laminate which includes i) lithium metal foil; and ii) a buffer layer including carbonaceous material particles, inorganic compound particles, polymer compound particles or their combination, and coated on one surface of the lithium metal foil; producing a negative electrode including a negative electrode current collector, and a negative electrode active material layer formed on at least one surface of the negative (Continued)

electrode current collector; and laminating the lithium metal laminate with the negative electrode in such a manner that the buffer layer of the lithium metal laminate is in contact with the negative electrode active material layer. A lithium metal laminate used for the method is also provided. The pre-lithiation of a negative electrode that includes a buffer layer reduces the problem of rapid volumetric swelling occurring.

11 Claims, 1 Drawing Sheet

(51) Int. Cl.
*H01M 4/04* (2006.01)
*H01M 4/133* (2010.01)
*H01M 4/62* (2006.01)
*H01M 10/0525* (2010.01)

(52) U.S. Cl.
CPC ....... *H01M 4/622* (2013.01); *H01M 10/0525* (2013.01); *H01M 2004/027* (2013.01); *H01M 2004/028* (2013.01)

(58) Field of Classification Search
CPC ....... H01M 10/0525; H01M 2004/027; H01M 2004/028; H01M 4/134; H01M 4/386; H01M 4/587
See application file for complete search history.

(56) References Cited

U.S. PATENT DOCUMENTS

| | | |
|---|---|---|
| 2014/0272594 A1 | 9/2014 | Safont Sempere et al. |
| 2014/0310951 A1* | 10/2014 | Grant .................. H01M 4/139 29/623.2 |
| 2015/0333385 A1 | 11/2015 | Sun et al. |
| 2015/0357628 A1 | 12/2015 | Li et al. |
| 2016/0141596 A1 | 5/2016 | Uhm et al. |
| 2016/0181594 A1* | 6/2016 | Balogh ............... H01M 4/0471 156/247 |
| 2017/0338480 A1 | 11/2017 | Kim et al. |
| 2017/0373338 A1* | 12/2017 | Teranishi ............ H01M 10/058 |
| 2019/0089016 A1* | 3/2019 | Paz .................... H01M 10/446 |

FOREIGN PATENT DOCUMENTS

| | | |
|---|---|---|
| EP | 2 437 333 A1 | 4/2012 |
| EP | 3 203 548 A1 | 8/2017 |
| EP | 3 584 860 A2 | 12/2019 |
| JP | 2000182602 A * | 6/2000 |
| JP | 2001-015172 A | 1/2001 |
| JP | 2007242590 A * | 9/2007 |
| JP | 2008-98151 A | 4/2008 |
| KR | 10-2007-0120734 A | 12/2007 |
| KR | 10-2011-0004068 A | 1/2011 |
| KR | 10-2012-0089512 A | 8/2012 |
| KR | 10-2012-0092529 A | 8/2012 |
| KR | 10-2014-0046496 A | 4/2014 |
| KR | 10-2015-0014676 A | 2/2015 |
| KR | 10-2016-0094652 A | 8/2016 |
| KR | 10-2017-0058798 A | 5/2017 |
| WO | WO 2013/009429 A1 | 1/2013 |

OTHER PUBLICATIONS

JP-2000182602-A Maekawa Espacenet machine translation (Year: 2000).*
Zhang et al., CN103378347A Espacenet machine translation (Year: 2013).*
English translation of CN Publication 107799721, Mar. 2018.*
International Search Report issued in PCT/KR2018/016386 (PCT/ISA/210), dated Apr. 25, 2019.
European Search Report for corresponding European Patent Application No. 18898130.2, dated Oct. 28, 2020.
EP Office Action dated Sep. 22, 2021 for corresponding EP Application No. 18 898 130.2.
Jin et al., "Challenges and Recent Progress in the Development of Si Anodes for Lithium-Ion Battery", Adv. Energy Mater., 2017, vol. 7, Nr. 23, p. 1700715, doi:1 0.1 002/aenm.201 700715, see fig. 5).
Kim et al., "Improved Cycling Performance of Lithium-Oxygen Cells by Use of a Lithium Electrode Protected with Conductive Polymer and Aluminum Fluoride", Appl. Mater. Interfaces, 2016, vol. 8, Nr. 47, p. 32300-32306, doi:1 0.1 021/acsami.6b1 0419).
Zhang et al., "Improving the initial Coulombic efficiency of hard carbon-based anode for rechargeable batteries with high energy density", J Mater Sci, May 19, 2017, vol. 52, pp. 10418-10430.

* cited by examiner

METHOD FOR PRE-LITHIATION OF NEGATIVE ELECTRODE FOR LITHIUM SECONDARY BATTERY AND LITHIUM METAL LAMINATE USED THEREFOR

TECHNICAL FIELD

The present application claims priority to Korean Patent Application No. 10-2018-0000809 filed on Jan. 3, 2018 and Korean Patent Application No. 10-2018-0165584 filed on Dec. 19, 2018 in the Republic of Korea, the disclosures of which are incorporated herein by reference.

The present disclosure relates to a method for pre-lithiation of a negative electrode for a lithium secondary battery and a lithium metal laminate used therefor.

BACKGROUND ART

As technological development and demand for various instruments have been increased, rechargeable secondary batteries have been increasingly in demand as energy sources. Among such secondary batteries, lithium secondary batteries having high energy density and voltage, long cycle life and a low discharge rate have been commercialized and used widely.

Such a lithium secondary battery generally uses, as a positive electrode active material, lithium-containing cobalt oxide ($LiCoO_2$) having a layered crystal structure, lithium-containing manganese oxide, such as $LiMnO_2$ having a layered crystal structure, $LiMn_2O_4$ having a spinel crystal structure, or the like, and lithium-containing nickel oxide ($LiNiO_2$). In addition, a carbonaceous material is used frequently as a negative electrode active material. Recently, a high-capacity secondary battery has been increasingly in demand, and thus combined use with a silicon-based material or silicon oxide-based material having effective capacity at least 10 times higher than the capacity of a carbonaceous material has been considered.

However, a lithium secondary battery has various problems, a part of which are related with the manufacture of a negative electrode and operation characteristics.

For example, a carbonaceous negative electrode active material forms a solid electrolyte solution interface (SEI) layer on the surface of the negative electrode active material during the initial charge/discharge process (activation process). Due to this, there are problems in that initial irreversibility occurs, the SEI layer may be destroyed during the continuous charge/discharge processes and an electrolyte solution is depleted during the regeneration process to cause degradation of battery capacity.

Moreover, although a silicon-based material shows high capacity, it shows a volumetric swelling ratio of 300% or more, as charge/discharge cycles proceed, to cause an increase in resistance and side reaction with an electrolyte solution. Thus, the problems, such as damages upon the electrode structure, caused by the formation of the SEI layer may become serious.

Use of a silicon oxide-based material may be considered, since it has a smaller volumetric swelling ratio and higher durability and life characteristics as compared to a silicon-based material. However, the silicon oxide-based material also has problems of high initial irreversibility due to the formation of the SEI layer upon charge and $Li_2O$ derived from oxygen in the active material.

To solve the above-mentioned problems, studies have been conducted to convert oxygen in the silicon oxide-based material, which causes an increase in irreversible capacity, into lithium oxide by making an attempt on pre-lithiation of a silicon oxide-based material.

One of such attempts is contacting lithium metal foil directly with a negative electrode to carry out pre-lithiation. Referring to FIG. 1 illustrating this, a negative electrode active material layer 200 formed on one surface of a current collector 100 is in direct contact with lithium metal foil 300. As a result, lithium ions are diffused rapidly toward the negative electrode. For this, some materials, such as Si-based materials, which show a large change in volume upon charge/discharge, undergo rapid volumetric swelling to cause degradation of the negative electrode undesirably.

DISCLOSURE

Technical Problem

The present disclosure is designed to solve the problems of the related art and technical problems that have been asked from the past.

The present disclosure is directed to providing a method for reducing a rate of lithium ion transport from lithium metal foil into a negative electrode active material to a desired rate in a process for pre-lithiation using lithium metal foil.

The present disclosure is also directed to providing a structure for use in reducing a transport rate of lithium ions in a process for pre-lithiation using lithium metal foil.

Technical Solution

According to the first embodiment of the present disclosure, there is provided a method for pre-lithiation of a negative electrode, including the steps of: producing a lithium metal laminate which includes i) lithium metal foil; and ii) a buffer layer including carbonaceous material particles, inorganic compound particles, polymer compound particles or their combination, and coated on one surface of the lithium metal foil, wherein the buffer layer has a thickness of 2.5-32.5 μm; producing a negative electrode including a negative electrode current collector, and a negative electrode active material layer formed on at least one surface of the negative electrode current collector; and laminating the lithium metal laminate with the negative electrode in such a manner that the buffer layer of the lithium metal laminate is in contact with the negative electrode active material layer.

According to the second embodiment of the present disclosure, there is provided the method for pre-lithiation of a negative electrode as defined in the first embodiment, wherein the buffer layer has a thickness of 5-15 μm.

According to the third embodiment of the present disclosure, there is provided the method for pre-lithiation of a negative electrode as defined in the first or the second embodiment, wherein the particles of the buffer layer have a closely packed or densely packed structure so that they may be in surface contact with each other, and the interstitial volume defined by the surface contact of the particles function as pores.

According to the fourth embodiment of the present disclosure, there is provided the method for pre-lithiation of a negative electrode as defined in any one of the first to the third embodiments, which further includes a step of wetting the negative electrode with an electrolyte solution composition, before laminating the buffer layer with the negative electrode.

According to the fifth embodiment of the present disclosure, there is provided the method for pre-lithiation of a negative electrode as defined in any one of the first to the fourth embodiments, which further includes a step of pressurizing the laminate of the lithium metal laminate and the negative electrode with a force of 0.1-50 kgf per 1.5 cm$^2$, after laminating the lithium metal laminate with the negative electrode.

According to the sixth embodiment of the present disclosure, there is provided a lithium metal laminate which includes: i) lithium metal foil; and ii) a buffer layer including carbonaceous material particles, inorganic compound particles, polymer compound particles or their combination, and coated on one surface of the lithium metal foil, wherein the buffer layer has a thickness of 2.5-32.5 μm.

According to the seventh embodiment of the present disclosure, there is provided the lithium metal laminate as defined in the sixth embodiment, wherein the buffer layer has a thickness of 5-15 μm.

According to the eighth embodiment of the present disclosure, there is provided the lithium metal laminate as defined in the sixth or the seventh embodiment, wherein the particles of the buffer layer have a closely packed or densely packed structure so that they may be in surface contact with each other, and the interstitial volume defined by the surface contact of the particles function as pores.

According to the ninth embodiment of the present disclosure, there is provided the lithium metal laminate as defined in any one of the sixth to the eighth embodiments, wherein the carbonaceous material particles or the inorganic compound particles are bound by a binder polymer.

According to the tenth embodiment of the present disclosure, there is provided a lithium secondary battery including the pre-lithiated negative electrode obtained from the method as defined in any one of the first to the fifth embodiments.

Advantageous Effects

According to an embodiment of the present disclosure, it is possible to reduce a rate of transport/intercalation of lithium ions generated from lithium metal foil into a negative electrode active material by using a lithium metal laminate having a buffer layer attached to one surface of lithium metal foil to allow the buffer layer to be interposed between the negative electrode and the lithium metal foil and to carry out pre-lithiation of the negative electrode. As a result, it is possible to solve the problem of rapid volumetric swelling occurring in the conventional pre-lithiation process due to rapid transport/intercalation of lithium ions into the negative electrode active material.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected electrically to another portion' by way of the other element interposed between them.

Throughout the specification, the expression 'a part ⌈includes⌋ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

According to an embodiment of the present disclosure, there is provided a method for pre-lithiation of a negative electrode, including the steps of: producing a lithium metal laminate which includes i) lithium metal foil; and ii) a buffer layer including carbonaceous material particles, inorganic compound particles, polymer compound particles or their combination, and coated on one surface of the lithium metal foil; producing a negative electrode including a negative electrode current collector, and a negative electrode active material layer formed on at least one surface of the negative electrode current collector; and laminating the lithium metal laminate with the negative electrode in such a manner that the buffer layer of the lithium metal laminate may be in contact with the negative electrode active material layer, and carrying out pre-lithiation. The buffer layer may include a plurality of pores.

Figure 1:
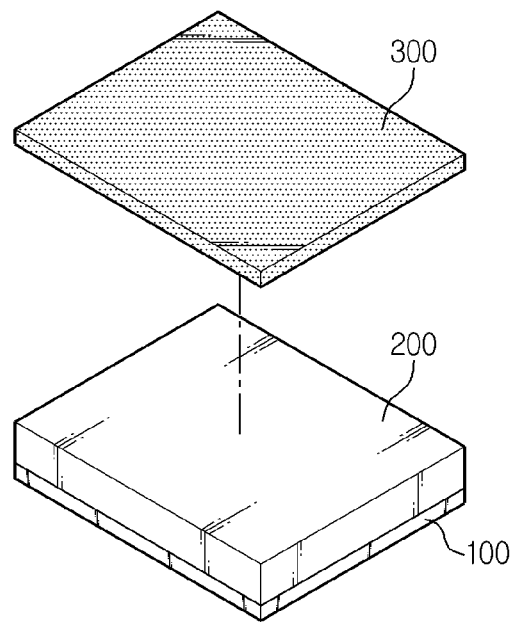
FIG. 1 is a schematic view illustrating the process for applying lithium metal foil to a negative electrode according to the related art.
Figure 2:
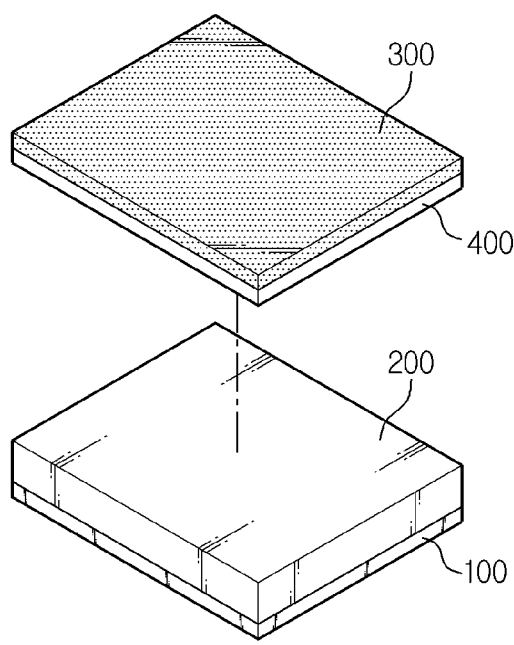
FIG. 2 is a schematic view illustrating the process for applying a lithium metal laminate having a buffer layer attached to one surface of lithium metal foil to a negative electrode according to an embodiment of the present disclosure.

Referring to FIG. 2 illustrating an embodiment of the present disclosure, a negative electrode including a negative electrode active material layer 200 formed on one surface of a current collector 100 is in contact with a lithium metal laminate including a buffer layer 400 attached to one surface of lithium metal foil 300 for the purpose of pre-lithiation. Herein, the buffer layer 400 is in contact with the negative electrode active material layer 200.

The buffer layer may have a lithium ion permeability of 100-4000 sec/100 mL, or 500-3000 sec/100 mL. When the buffer layer has a permeability within the above-defined range, it is possible to facilitate efficient pre-lithiation while controlling the pre-lithiation rate. The permeability refers to the time required for 100 cc of gas to pass through a buffer layer, when spraying the gas to the surface of the buffer layer. Particularly, the sample area of the buffer layer is a circle having a diameter of 3 cm, and the time required for 100 cc of gas to pass through the sample area, when spraying gas containing a mixture of nitrogen with air to the sample area, may be determined.

In addition, the buffer layer may have an ion conductivity of $10^{-1}$ to $10^{-7}$ S/cm or of $10^{-3}$ to $10^{-6}$ S/cm. When the buffer layer has an ion conductivity within the above-defined range, it is possible to carry out pre-lithiation at an adequate rate, not too fast and not too slow, while not causing any damage upon the negative electrode active material. The ion conductivity value mentioned herein is determined by the following method. First, a pellet-like sample (buffer layer material) having a width of A and a thickness of t is prepared, and a platinum or copper electrode, which has high electro-conductivity, is dry deposited on both surfaces of the sample. An alternating current is applied through the electrodes on both surfaces of the sample, wherein the amplitude is 5-10 mV and the frequency range used for measurement is set to 0.1 Hz to 1 MHz. Then, resistance Rb of a bulk electrolyte solution is calculated from the point of intersection, where the semi-circle of the measured impedance meets the real number axis, and ion conductivity σ is calculated from the sample area A and thickness t according to the following formula:

$$\sigma(\Omega \cdot cm)^{-1} = (1/Rb) \cdot (1/A)$$

Preferably, the lithium metal foil is larger in size than the negative electrode active material layer so that it may totally cover the negative electrode active material. In addition, the lithium metal foil may have a thickness of 10-300 μm, 50-250 μm, or 100-200 μm. When the lithium metal foil has a thickness smaller than the lower limit, it is not possible to carry out pre-lithiation sufficiently. When the lithium metal foil has a thickness larger than the upper limit, lithium ion transport rate becomes too slow.

The buffer layer is formed on one surface of the lithium metal foil. The buffer layer may have a thickness of 2.5-32.5 μm, or 5-15 μm. When the buffer layer has a thickness smaller than the lower limit, lithium ion transport rate becomes insufficient. When the buffer layer has a thickness larger than the upper limit, lithium ion transport rate becomes too slow.

The buffer layer may include, as a main ingredient, a particle-shaped carbonaceous material, particle-shaped inorganic compound or a particle-shaped polymer compound, alone or in combination. In an embodiment, the buffer layer uses a polymer compound as a binder polymer, wherein the carbonaceous material particles and/or the inorganic compound particles are bound by the binder polymer.

Non-limiting examples of the carbonaceous material may include graphite, amorphous carbon, carbon nanotubes or graphene.

The inorganic compound is to be understood that it has a general meaning including inorganic oxide and non-limiting examples thereof include $Li_4Ti_5O_{12}$, $TiO_2$, $CoO_x$, $FeO_x$, NiO, $VO_x$, ZnO, $SnO_x$, $MnO_x$, $CuO_x$, $MoO_x$, $SiO_x$, $AlO_x$, LiF, $Li_2O$, and $Li_2CO_3$.

Non-limiting examples of the polymer compound include, but are not limited to compounds, such as polyvinylidene fluoride (PVDF), polyacrylic acid (PAA), polyvinyl alcohol (PVA), carboxymethyl cellulose, hydroxypropylene cellulose, diacetylene cellulose, polyvinyl chloride, polyvinyl pyrrolidone, polytetrafluoroethylene (PTFE), polyethylene or polypropylene.

In the buffer layer, the particles are bound to each other. In addition, the particles are in contact with lithium metal upon impregnation with an electrolyte solution, undergo lithium intercalation spontaneously, and then diffuse lithium ions to the negative electrode so that the negative electrode may be pre-lithiated. The particles may be bound with each other during drying or by means of the binder polymer, but is not limited thereto.

The particles may have an average particle diameter ($D_{50}$) of 0.1-15 μm, 1-12 μm, or 5-10 μm, based on the longest particle diameter. As used herein, 'average particle diameter ($D_{50}$)' means a value determined as particle weight average $D_{50}$ (particle diameter or median diameter when accumulated weight is 50% of the total weight) in particle distribution determination obtained by the laser beam diffraction method.

The particle shape is not particularly limited, as long as it meets the purpose of the present disclosure. The particle shape may be a spherical, elliptical, sheet-like or flake-like shape. To form voids (pores) that may be impregnated well with an electrolyte solution, the particles shape is a spherical or elliptical shape, preferably.

When the polymer compound is used alone in the form of particles to form a buffer layer, the polymer compound may be dispersed in a dispersion medium, such as tetrahydrofuran (THF) or hexane, and the resultant dispersion may be coated on one surface of lithium metal foil to a small thickness and dried to form a buffer layer including a particle-shaped polymer compound.

When the particle-shaped carbonaceous material and/or inorganic compound is used without any binder polymer, the particles may be formed into emulsion and the resultant emulsion may be coated on one surface of lithium metal foil and dried to form a buffer layer. However, the scope of the present disclosure is not limited thereto.

When polymer compound particles, such as polyvinylidene fluoride (PVDF), polyacrylic acid (PAA), polyvinyl alcohol (PVA), carboxymethyl cellulose, hydroxypropyl cellulose, diacetylene cellulose, polyvinyl chloride, polyvinyl pyrrolidone, polytetrafluoroethylene (PTFE), polyethylene or polypropylene, is used in combination with carbonaceous material particles and/or inorganic compound particles, they may contribute to the binding of the carbonaceous material particles and/or inorganic particles, and/or the binding between the carbonaceous material particles and/or inorganic particles and lithium metal foil.

The buffer layer may further include a binder polymer resin. The binder polymer may be used in an amount of 1-20 wt %, 2-10 wt %, or 3-7 wt %, based on 100 parts by weight of the total particles contained in the buffer layer. Non-limiting examples of the binder polymer resin may include, but are not limited to: polyvinylidene fluoride (PVDF), polyacrylic acid (PAA), polyvinyl alcohol (PVA), carboxymethyl cellulose, hydroxypropyl cellulose, diacetylene cellulose, polyvinyl chloride, polyvinyl pyrrolidone, polytetrafluoroethylene (PTFE), polyethylene or polypropylene.

In an embodiment of the method for forming a buffer layer, the binder polymer is dissolved in an organic solvent, such as N-methyl pyrrolidone, and then a particle-shaped carbonaceous material and/or inorganic compound is added thereto, followed by agitation and mixing, to obtain slurry for a buffer layer. Then, the slurry is coated and dried on one surface of lithium metal foil to obtain a lithium metal laminate. For example, the coating may be carried out at a relative humidity of 20% or more through at least one process selected from the group consisting of spray coating, ink jet printing, slit coating, die coating, spin coating and sputtering coating, but is not limited thereto. The drying may be carried out in such a manner that the binder polymer dissolved in the slurry for a buffer layer may undergo phase inversion through vapor-induced phase separation known to those skilled in the art, for example under such a condition that the solvent in the slurry may evaporate and be dried for 10 minutes to 5 hours.

Otherwise, the slurry for a buffer layer may be coated and dried on a release film, not lithium metal foil, the resultant buffer layer may be transferred to one surface of lithium metal foil, and then the release film may be removed to obtain a lithium metal laminate.

For example, the release film may be made of a thermoplastic resin or thermosetting resin. With a view to flexibility, the release film may be made of a thermoplastic resin, preferably. The thermoplastic resin may be polyolefins, polyvinyl alcohol polymers, polyesters, polyamides, polyimides, polycarbonates, polyphenylene ethers, polyphenylene sulfides, cellulose derivatives or their mixtures. Polyesters and polyimides are preferred with a view to a balance between heat resistance and flexibility.

To carry out coating of the slurry for a buffer layer on a release film, the slurry for a buffer layer may be coated on a release film and then allowed to undergo phase inversion during the drying step, or may be subjected to spray drying. However, the scope of the present disclosure is not limited thereto.

Through such spray drying, water may be removed substantially, thereby providing particle-shaped powder. An apparatus for carrying out such spray drying may include a drying chamber in which spray drying is carried out substantially, a hot air introduction line connected to the drying chamber to supply hot air into the drying chamber so that the dispersion medium may be removed, an air outlet connected to the drying chamber to discharge the air cooled during the spray drying, a raw material introduction line which penetrates through the walls forming the drying chamber to supply raw materials into the drying chamber so that they may be spray dried, and a powder recovery line connected to the drying chamber to recover the powder formed by spray drying in the drying chamber. However, the scope of the present disclosure is not limited thereto.

For example, the spraying drying may be carried out by spraying the slurry of a buffer layer at an inlet temperature of 200-250° C. and at an outlet temperature of 60-80° C. of the drying chamber of the spray drying apparatus at a rate of 15~25 cc/min, but is not limited thereto.

The finally formed buffer layer has a closely packed or densely packed structure of particles regardless of its manufacturing process so that the particles may be in surface contact with each other, and the interstitial volume defined by the surface contact of the particles may function as pores. By virtue of the structure, impregnation with an electrolyte solution may be performed smoothly. According to an embodiment of the present disclosure, no pressing is carried out in order to retain the above-mentioned packed structure of the buffer layer.

Multiple pores formed in the buffer layer may have an average pore diameter of 0.1-10 μm or 1-5 μm. Herein, the average pore diameter may be determined by substituting the following mathematical formula with the pore volume and pore area obtained by the measurements of pore size distribution measured by the following mercury intrusion porosimetry.

Average pore diameter $(P)(\mu m) = 4V/A$ (wherein V is a pore volume and A is a pore area).

The porosity formed by the pores formed in the buffer layer may be 10-50% or 20-40%. Herein, the porosity is calculated by the following mathematical formula by using the true density of the buffer layer and the density of the buffer layer.

Porosity=(True density−Buffer layer density)/True density×100%

In addition, the buffer layer preferred according to the present disclosure has a uniform thickness, wherein the thickest part and the thinnest part of the buffer layer preferably have a deviation in thickness of 1% or less.

The negative electrode current collector that may be used herein is a current collector used currently in the art with no particular limitation. Non-limiting examples of the negative electrode current collector may include copper foil, nickel foil, stainless steel foil, titanium foil, nickel foam, copper foam, polymer substrate coated with conductive metal, or a combination thereof.

The negative electrode active material layer may include a negative electrode active material, a binder polymer and a conductive material optionally with additives. The negative electrode active material, binder polymer, conductive material and other additives are added to a solvent to form negative electrode active material slurry, which, in turn, is coated and dried on at least one surface of the negative electrode current collector, followed by pressing, to form a negative electrode.

For example, the silicon-based negative electrode active material may include Si, silicon oxide particles ($SiO_x$, $0<x\leq 2$), silicon oxide particles ($SiO_x$, $0<x\leq 2$) doped with or chemically bound with metal, such as Mg, Si-metal alloy, and alloys of Si with silicon oxide particles ($SiO_x$, $0<x\leq 2$) or their combination. Herein, the silicon oxide particles ($SiO_x$, $0<x\leq 2$) may be a composite including crystalline $SiO_2$ and amorphous Si.

The silicon-based negative electrode active material may have an average particle diameter ($D_{50}$) of 7 μm or less. As used herein, 'average particle diameter ($D_{50}$)' means a value determined as particle weight average $D_{50}$ (particle diameter or median diameter when accumulated weight is 50% of the total weight) in particle size distribution determination obtained by the laser beam diffraction method.

The silicon-based negative electrode active material may be surface coated with carbon. When the silicon-based negative electrode active material is surface-coated with carbon, it is possible to inhibit reaction with an electrolyte solution, to improve conductivity, and to inhibit swelling of active material particles. For example, the carbon coating layer may be present in an amount of 1-20 wt %, 5-17 wt % or 10-15 wt % based on the weight of the negative electrode active material including the carbon coating layer.

The negative electrode active material may further include a carbonaceous negative electrode active material. For example, the carbonaceous negative electrode active material may include natural graphite, artificial graphite, soft carbon, hard carbon or a combination thereof. For example, the carbonaceous negative electrode active material may be present in an amount of 80-95 wt % based on the weight of the negative electrode active material. It is possible to control the capacity per weight by blending the carbonaceous negative electrode active material with the silicon-based negative electrode active material.

The binder polymer may be used for binding active material particles to retain a shaped body and is not particularly limited as long as it is a conventional binder polymer used for manufacturing an electrode. For example, non-aqueous binders, such as polyvinyl alcohol, carboxymethyl cellulose, hydroxypropyl cellulose, diacetylene cellulose, polyvinyl chloride, polyvinyl pyrrolidone, polytetrafluoroethylene (PTFE), polyvinylidene fluoride (PVDF), polyethylene or polypropylene, may be used. In addition, aqueous binders that are more economical and eco-friendly as compared to non-aqueous binders may be used. Particular examples of aqueous binders may include styrene-butadiene rubber (SBR), carboxymethyl cellulose (CMC), acrylonitrile-butadiene rubber, acrylic resin, hydroxyethyl cellulose or a combination thereof. Preferably, the binder polymer used for a negative electrode is an aqueous binder. The aqueous binder polymer may be used in an amount of 1-30 wt %, preferably 1-2 wt %, based on the total weight of the negative electrode active material layer.

The conductive material is not particularly limited, as long as it has conductivity while not causing any chemical change in the corresponding battery. Particular examples of the conductive material include: graphite, such as natural graphite or artificial graphite; carbon black, such as acetylene black, Ketjen black, channel black, furnace black, lamp black or thermal black; conductive fibers, such as carbon fibers or metallic fibers; metal powder, such as carbon fluoride, aluminum or nickel powder; or the like.

According to the present disclosure, the method for pre-lithiation is not particularly limited, as long as pre-lithiation is carried out while the buffer layer of the lithium metal laminate is in contact with the negative electrode active material layer.

According to an embodiment of the present disclosure, pre-lithiation may be carried out by wetting the negative electrode with the first electrolyte solution for a predetermined time and laminating the negative electrode with a lithium metal laminate in the first electrolyte solution in such a manner that the buffer layer of the lithium metal laminate may face the negative electrode active material layer. Since the buffer layer of the lithium metal laminate used herein has pores, excessive pressurization to the lithium metal laminate and the negative electrode may cause cracking or other damages upon the particles in the buffer layer of the lithium metal laminate, may block the pores of the buffer layer of the lithium metal laminate, and may cause damages upon the negative electrode. Therefore, it is preferred to reduce the pressure applied to the lithium metal laminate and the negative electrode as much as possible in the procedure after wetting the negative electrode active material layer sufficiently.

Hereinafter, the process for laminating the lithium metal laminate with the negative electrode in the first electrolyte solution in such a manner that the buffer layer of the lithium metal laminate may face the negative electrode active material layer, after wetting the negative electrode with the first electrolyte solution for a predetermined time, will be described in detail.

Before laminating the negative electrode with the lithium metal laminate, the electrolyte solution (the first electrolyte solution) infiltrates homogeneously into the negative electrode active material through wetting. Then, lithium ions are diffused homogeneously into the negative electrode upon the lamination of the negative electrode with the lithium metal laminate. In this manner, it is possible to carry out pre-lithiation over the whole negative electrode at a homogeneous lithium ion concentration.

The wetting may be carried out by dipping the negative electrode in the first electrolyte solution for 1-30 hours. When the dipping time is less than 1 hour, it is not possible to carry out pre-lithiation sufficiently since the negative electrode active material is not wetted sufficiently with the electrolyte solution. When the dipping time is larger than 30 hours, the durability of the electrode is decreased, and thus the active material may be detached from the current collector with ease during the process.

To facilitate the wetting, the reactor where wetting is carried out may be in a vacuum state less than 760 mmHg. Herein, the first electrolyte solution used for wetting may have a temperature of 30-60° C.

The first electrolyte solution used for pre-lithiation may include the first organic solvent and the first electrolyte salt. The first organic solvent is not particularly limited, as long as it is an organic solvent used currently in an electrolyte solution in the art. However, it is preferred for the first organic solvent to have a high boiling point in order to provide a low amount of evaporation during wetting. For example, the organic solvent may include ethylene carbonate (EC) and ethyl methyl carbonate (EMC). Preferably, the organic solvent may essentially consist of ethylene carbonate and ethyl methyl carbonate. More preferably, the organic solvent may be an organic solvent consisting of ethylene carbonate and ethyl methyl carbonate at a volume ratio of 50:50. In a variant, the first electrolyte solution may further include 1,2-dimethoxyethane (DME), γ-butyrolactone (GBL), tetrahydrofuran (THF), 1,3-dioxolane (DOXL), dimethyl ether (DME), methyl propionate (MP), sulforane, dimethyl sulfoxide (DMSO), acetonitrile (AN) and tetraethyleneglycol dimethyl ether (TEGDME) or their mixtures without departing from the scope of the present disclosure. The electrolyte salt may be $LiBF_4$, $LiClO_4$, $LiPF_6$, $LiAsF_6$, $LiCF_3SO_3$, $Li(CF_3SO_2)_2N$, $LiC_4F_9SO_3$, $Li(CF_3SO_2)_3C$, $LiBPh_4$ or their combination The electrolyte salt may be present at a concentration of 1-2M in the first organic solvent.

Then, the negative electrode may be laminated with the lithium metal laminate in such a manner that the buffer layer of the lithium metal laminate may face the negative electrode active material layer. Herein, the lithium metal laminate and the negative electrode may be pressurized with a force of 0.1-50 kgf or 1-30 kgf per 1.5 $cm^2$ by using a flat jig. When the pressurization force is smaller than the lower limit, it is not possible to carry out pre-lithiation sufficiently. When the pressurization force is larger than the upper limit, the electrode and the buffer layer may be physically damaged. Herein, the flat jig may be made of a material having no reactivity with the organic electrolyte solution. For example, the jig may be made of polyether ether ketone (PEEK).

The pre-lithiation may be carried out by applying an electric current of 10 mA to 10 A for 0.1-12 hours, particularly by applying an electric current of 100 mA to 5 A for 1-10 hours. In the pre-lithiation, the extent of electric current or time are optimized conditions for carrying out desired pre-lithiation. When the conditions are not within the above-defined ranges, pre-lithiation is not accomplished substantially, the thickness of a lithium byproduct layer is increased to show increased resistance, or a longer time is required, thereby causing degradation of productivity undesirably.

Then, the negative electrode and the lithium metal laminate are taken out of the first electrolyte solution and the lithium metal laminate is removed. After that, the negative electrode is washed with dimethyl carbonate, followed by drying. When using dimethyl carbonate for washing, lithium salt may be dissolved and washed sufficiently while not causing damages upon the negative electrode. The drying may be carried out in the conventional manner. For example, the negative electrode may be dried in a dry room at 20-40° C. for 1-5 hours.

The negative electrode forms an electrode assembly together with a positive electrode including a positive electrode active material and a separator. The electrode assembly and an electrolyte solution (the second electrolyte solution) are received in a battery casing to provide a lithium secondary battery.

The positive electrode active material may be selected from a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+x}Mn_{2-y}O_4$ (wherein y is 0-0.33), $LiMnO_3$, $LiMn_2O_3$ or $LiMnO_2$; a lithium copper oxide ($Li_2CuO_2$); a vanadium oxide such as $LiV_3O_8$, $LiFe_3O_4$, $V_2O_5$ or $Cu_2V_2O_7$; a Ni-site type lithium nickel oxide represented by the chemical formula of $LiNi_{1-y}M_yO_2$ (wherein M is Co, Mn, Al, Cu, Fe, Mg, B or Ga, and y is 0.01-0.3); a ternary lithium manganese composite oxide represented by the chemical formula of $LiMn_{2-y}M_yO_2$ (wherein M=Co, Ni, Fe, Cr, Zn or Ta, and y is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$; ternary lithium transition metal composite oxide represented by the chemical formula of $Li(Ni_aCo_bMn_c)O_2$ ($0<a<1$, $0<b<1$, $0<c<1$, $a+b+c=1$); or the like, but is not limited thereto.

The positive electrode active material may be dispersed in an organic solvent together with a binder polymer, conductive material and other additives to form positive electrode mixture slurry, and the slurry may be coated onto at least one surface of a positive electrode current collector, followed by drying and pressing, to form a positive electrode.

Non-limiting examples of the positive electrode current collector include foil made of aluminum, nickel or a combination thereof, and those of the negative electrode current collector include foil made of copper, gold, nickel, copper alloy or a combination thereof.

The binder polymer, conductive material and other additives used for the positive electrode may be the same as or different from those used for the negative electrode. See, the above description with reference to the negative electrode.

The second electrolyte solution includes conventional electrolyte solution ingredients, such as the second organic solvent and the second electrolyte salt. The second electrolyte salt that may be used is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Particularly, a lithium salt is preferred. For example, $LiClO_4$, $LiCF_3SO_3$, $LiPF_6$, $LiAsF_6$, $LiN(CF_3SO_2)_2$ or a combination thereof may be used.

The organic solvent used for the second electrolyte solution may include a currently known solvent, such as a cyclic carbonate solvent; liner carbonate solvent; ester solvent; nitrile solvent; phosphate solvent; or a combination thereof, wherein the solvent may include a halogen substituent or not. For example, the organic solvent that may be used includes propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a combination thereof.

The lithium secondary battery according to an embodiment of the present disclosure may be provided in the form of a cylindrical battery using a can, prismatic, pouch-type or coin-type battery, but its outer shape or casing is not limited thereto. In addition, the lithium secondary battery according to an embodiment of the present disclosure may include any conventional lithium secondary batteries, such as a lithium metal secondary battery, lithium ion secondary battery, lithium polymer secondary battery or a lithium ion polymer secondary battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Negative Electrode>

First, 92 wt % of a negative electrode active material (graphite:SiO=7:3), 3 wt % of Denka black, 3.5 wt % of styrene-butadiene rubber (SBR) and 1.5 wt % of carboxymethyl cellulose (CMC) were added to water to obtain negative electrode mixture slurry. The resultant negative electrode mixture slurry was coated on one surface of a copper current collector, followed by drying and pressing.

<Manufacture of Lithium Metal Laminate Coated with Buffer Layer on One Surface of Lithium Metal Foil>

To obtain a buffer layer, 95 wt % of $Li_4Ti_5O_{12}$ inorganic particles (Sigma Aldrich) having an average particle diameter ($D_{50}$) of 2 μm and 5 wt % of polyvinylidene fluoride (PVDF) (Kureha, kf9700) were prepared. Polyvinylidene fluoride was added to N-methyl pyrrolidone to form a binder polymer solution, $Li_4Ti_5O_{12}$ inorganic particles were added thereto, and the solid content was controlled to 50% to obtain slurry. The slurry was coated onto one surface of lithium metal foil (150 μm) to a thickness of 10 μm and dried at a temperature of 60° C. for 5 hours to form a buffer layer having a porosity of 35% on one surface of the lithium metal foil, thereby providing a lithium metal laminate. Herein, additional pressing was not carried out. The particles of the buffer layer have a closely packed or densely packed structure so that they may be in surface contact with each other substantially, and the interstitial volume defined by the surface contact between particles may function as pores.

The porosity was calculated from the true density (3.5 g/cc) of the $Li_4Ti_5O_{12}$ inorganic particles, the true density (1.77 g/cc) of PVDF, and the density of the buffer layer obtained by dividing the loading amount of the buffer layer by volume (area×thickness) based on the following mathematical formula.

Porosity=(True density−Buffer layer density)/True density×100%

<High-Pressure Direct Contact Pre-Lithiation>

The negative electrode obtained as described above was wetted with an electrolyte solution (electrolyte solution containing 1M $LiPF_6$ dissolved in a mixed solvent of ethylene carbonate (EC) and ethyl methyl carbonate (EMC) at a volume ratio of 50:50) for 10 hours. In the presence of the electrolyte solution, the negative electrode was laminated with the lithium metal laminate obtained as described above in such a manner that the buffer layer of the lithium metal laminate might face the negative electrode active material layer. Then, a flat jig was linked thereto to carry out pressurization with a force of 30 kgf per 1.5 cm². After the pressurization was continued for 30 minutes, the lithium metal foil was removed and the resultant laminate was washed with dimethyl carbonate (DMC) and dried with minimized exposure to water.

<Manufacture of Lithium Secondary Battery>

The negative electrode and a positive electrode using $LiCoO_2$ were cut into a coin cell size and a polyolefin separator was interposed between the negative electrode and the positive electrode. Then an electrolyte solution containing 1M $LiPF_6$ dissolved in a mixed solvent of ethylene carbonate (EC) and ethyl methyl carbonate (EMC) at a volume ratio of 50:50 was injected to obtain a coin-type full cell.

Example 2

A lithium secondary battery of a coin-type full cell was obtained in the same manner as described in Example 1, except that the lithium metal buffer layer was coated to a thickness of 5 μm.

Example 3

A lithium secondary battery of a coin-type full cell was obtained in the same manner as described in Example 1, except that the lithium metal buffer layer was coated to a thickness of 15 μm.

Comparative Example 1

A lithium secondary battery of a coin-type full cell was obtained in the same manner as described in Example 1, except that no lithium metal buffer layer was formed.

Comparative Example 2

A lithium secondary battery of a coin-type full cell was obtained in the same manner as described in Example 1, except that the lithium metal buffer layer was coated to a thickness of 50 μm.

Comparative Example 3

A lithium secondary battery of a coin-type full cell was obtained in the same manner as described in Example 1, except that pre-lithiation was not carried out.

Comparative Example 4

A lithium secondary battery of a coin-type full cell was obtained in the same manner as described in Example 1, except that the lithium metal buffer layer was coated to a thickness of 100 μm.

<Cycle Charge/Discharge Test>

Each of the coin-type full cells according to Examples 1-3 and Comparative Examples 1-4 was tested for its charge/discharge reversibility by using an electrochemical charger. Upon charging, electric current was applied at a current density of 0.1 C-rate to a voltage of 4.2 V (vs. LAO. Upon discharging, discharge was carried out to a voltage of 2.5V at the same current density. Herein, the capacity maintenance for 100 cycles is shown in the following Table 1.

TABLE 1

|  | Buffer layer thickness (μm) | Pre-lithiation | Capacity maintenance for 100 cycles (%) |
|---|---|---|---|
| Ex. 1 | 10 | ○ | 87 |
| Ex. 2 | 5 | ○ | 86 |
| Ex. 3 | 15 | ○ | 87 |
| Comp. Ex. 1 | None | ○ | 82 |
| Comp. Ex. 2 | 50 | ○ | 84 |
| Comp. Ex. 3 | 10 | X | 73 |
| Comp. Ex. 4 | 100 | ○ | 75 |

The reason of such a difference in capacity maintenance is as follows. In Comparative Example 1, pre-lithiation is carried out while the lithium metal foil is in direct contact with the negative electrode, and thus lithium ions are diffused rapidly toward the negative electrode. However, the Si-containing compound in the negative electrode active material undergoing a significant change in volume during charge/discharge causes easy deterioration of the negative electrode due to its rapid swelling. Therefore, it is required to form a buffer layer including carbonaceous or oxide particles ($Li_4Ti_5O_{12}$, $TiO_2$, or the like) on one surface of the lithium metal foil to reduce the transport rate of lithium ions. In this manner, pre-lithiation of the negative electrode may occur gradually, thereby preventing rapid swelling. Meanwhile, in the case of Comparative Example 2 in which the buffer layer is coated to a thickness of 50 μm, it shows lower capacity maintenance for 100 cycles as compared to Example 1. This is because the buffer layer is too thick to carry out sufficient pre-lithiation of the negative electrode. As a result, the efficiency of negative electrode is not improved sufficiently, and the cycle characteristics are degraded.

In the case of Comparative Example 3 in which the buffer layer is coated to a thickness of 10 μm but no pre-lithiation is carried out, the battery shows low capacity maintenance due to the lack of the effect of pre-lithiation.

In the case of Comparative Example 4 in which the buffer layer is coated to a thickness of 100 μm, such an excessively thick buffer layer inhibits pre-lithiation, and thus the battery shows low capacity maintenance.

What is claimed is:

1. A method for pre-lithiation of a negative electrode, comprising the steps of:
   producing a lithium metal laminate which comprises i) lithium metal foil having a thickness of 150 μm to 300 μm; and ii) a buffer layer comprising inorganic compound particles, and at least one of carbonaceous material particles or polymer compound particles, said buffer layer having a first surface and a second surface opposite the first surface, wherein the first surface of the buffer layer is coated directly on one surface of the lithium metal foil, and wherein the buffer layer has a thickness of 5 μm to 15 μm,
   wherein the inorganic compound particles are $Li_4Ti_5O_{12}$;
   producing a negative electrode comprising a negative electrode current collector, and a negative electrode active material layer formed on at least one surface of the negative electrode current collector;
   wetting the negative electrode with an electrolyte solution composition, before laminating the lithium metal laminate with the negative electrode, and wherein, laminating the lithium metal laminate with the negative electrode is performed in the electrolyte solution composition;

laminating the lithium metal laminate with the negative electrode in such a manner that the second surface of the buffer layer of the lithium metal laminate is in direct contact with the negative electrode active material layer; and removing the lithium metal laminate from the negative electrode to obtain the pre-lithiated negative electrode.

2. The method for pre-lithiation of a negative electrode according to claim 1, wherein the particles of the buffer layer have a closely packed or densely packed structure so that they are in surface contact with each other, and an interstitial volume defined by the surface contact of the particles function as pores.

3. The method for pre-lithiation of a negative electrode according to claim 1, which further comprises a step of pressurizing the laminate of the lithium metal laminate and the negative electrode with a force of 0.1 kgf-50 kgf per 1.5 cm$^2$, after laminating the lithium metal laminate with the negative electrode.

4. The method for pre-lithiation of a negative electrode according to claim 1, wherein the lithium metal laminate is formed by a method comprising: coating polymer compound particles dispersed in a dispersion medium on a surface of the lithium metal foil.

5. The method for pre-lithiation of a negative electrode according to claim 1, wherein the lithium metal laminate is formed by a method comprising: coating carbonaceous material and/or inorganic compound particles on a surface of the lithium metal foil.

6. The method for pre-lithiation of a negative electrode according to claim 1, wherein the polymer compound is present in the buffer layer as a binder polymer, and wherein the carbonaceous material particles and/or the inorganic compound particles are bound by the binder polymer.

7. The method for pre-lithiation of a negative electrode according to claim 1, wherein the polymer compound particles are present and comprise a binder polymer, which is at least one selected from the group consisting of polyvinylidene fluoride (PVDF), polyacrylic acid (PAA), polyvinyl alcohol (PVA), carboxymethyl cellulose, hydroxypropylene cellulose, diacetylene cellulose, polyvinyl chloride, polyvinyl pyrrolidone, polytetrafluoroethylene (PTFE), polyethylene and polypropylene.

8. A lithium metal laminate for pre-lithiation of a negative electrode which comprises: i) lithium metal foil having a thickness of 150 μm to 300 μm; and ii) a buffer layer including inorganic compound particles, and at least one of carbonaceous material particles or polymer compound particles, and coated directly on one surface of the lithium metal foil, wherein the buffer layer has a thickness of 5 μm to 15 μm, wherein the inorganic compound particles are $Li_4Ti_5O_{12}$, wherein the carbonaceous material particles are selected from the group consisting of amorphous carbon, carbon nanotubes and graphene, wherein the carbonaceous material particles or the inorganic compound particles are bound by a binder polymer, and wherein the binder polymer is used in an amount from 1 to 20 wt. %.

9. The lithium metal laminate for pre-lithiation of the negative electrode according to claim 8, wherein the particles of the buffer layer have a closely packed or densely packed structure so that they may be in surface contact with each other, and an interstitial volume defined by the surface contact of the particles function as pores.

10. The lithium metal laminate for pre-lithiation of the negative electrode according to claim 8, wherein the polymer compound particles are present and comprise the binder polymer, which is at least one selected from the group consisting of polyvinylidene fluoride (PVDF), polyacrylic acid (PAA), polyvinyl alcohol (PVA), carboxymethyl cellulose, hydroxypropylene cellulose, diacetylene cellulose, polyvinyl chloride, polyvinyl pyrrolidone, polytetrafluoroethylene (PTFE), polyethylene and polypropylene.

11. A lithium secondary battery comprising the pre-lithiated negative electrode obtained from the method as defined in claim 1.

* * * * *